(12) United States Patent
Farrow et al.

(10) Patent No.: US 11,092,091 B2
(45) Date of Patent: Aug. 17, 2021

(54) PRESSURE REGULATING MASS FLOW SYSTEM FOR MULTIPOINT GASEOUS FUEL INJECTION

(71) Applicants: Timothy J. Farrow, Fort Collins, CO (US); Michael Ryan Buehner, Fort Collins, CO (US); Gregory James Hampson, Boulder, CO (US); John Karspeck, Loveland, CO (US)

(72) Inventors: Timothy J. Farrow, Fort Collins, CO (US); Michael Ryan Buehner, Fort Collins, CO (US); Gregory James Hampson, Boulder, CO (US); John Karspeck, Loveland, CO (US)

(73) Assignee: Woodward, Inc., Fort Collins, CO (US)

( * ) Notice: Subject to any disclaimer, the term of this patent is extended or adjusted under 35 U.S.C. 154(b) by 325 days.

(21) Appl. No.: 15/925,534

(22) Filed: Mar. 19, 2018

(65) Prior Publication Data

US 2019/0285006 A1    Sep. 19, 2019

(51) Int. Cl.
*F02D 19/00*    (2006.01)
*F02D 19/02*    (2006.01)
(Continued)

(52) U.S. Cl.
CPC ......... *F02D 19/023* (2013.01); *F02D 19/022* (2013.01); *F02D 19/027* (2013.01);
(Continued)

(58) Field of Classification Search
CPC .... F02D 19/022; F02D 19/023; F02D 19/027; F02D 41/402; F02D 41/3854; F02M 21/0239
See application file for complete search history.

(56) References Cited

U.S. PATENT DOCUMENTS

| 5,090,390 A | * | 2/1992 | Feldinger | .................. F02D 9/12 123/337 |
| 5,146,941 A | * | 9/1992 | Statler | .................. G05D 7/0635 137/468 |

(Continued)

FOREIGN PATENT DOCUMENTS

| CN | 105 927 406 | 9/2016 |
| GB | 2314946 A | 1/1998 |

(Continued)

*Primary Examiner* — Phutthiwat Wongwian
*Assistant Examiner* — Sherman D Manley
(74) *Attorney, Agent, or Firm* — Reinhart Boerner Van Deuren P.C.

(57) ABSTRACT

Embodiments of a gaseous or dual fuel electronic pressure regulation system (EPRS) for a multipoint fuel injection engine are described herein. Additionally, embodiments of a method for controlling the EPRS are provided. In particular, the EPRS employs an electronic pressure regulator (EPR) capable of accurately determining and controlling the mass flow of gaseous fuel into a fuel rail so as to avoid pressure droop and over- and under-pressurization of the gas admission valves (GAVs). By using the EPRS described above, mass flow is able to be distributed to the downstream manifold or engine cylinders very accurately, and the GAVs are able to be driven simultaneously in a pressure/pulse duration that is optimal for accurate and repeatable operation.

25 Claims, 4 Drawing Sheets

(51) Int. Cl.
*F02M 21/02* (2006.01)
*F02D 41/38* (2006.01)
*F02D 41/40* (2006.01)
*F02D 41/00* (2006.01)
*F02D 19/06* (2006.01)

(52) U.S. Cl.
CPC ..... *F02D 41/0027* (2013.01); *F02D 41/3845* (2013.01); *F02D 41/3854* (2013.01); *F02D 41/402* (2013.01); *F02M 21/0239* (2013.01); *F02D 19/0605* (2013.01); *F02D 2200/0602* (2013.01); *F02M 21/0245* (2013.01)

(56) References Cited

U.S. PATENT DOCUMENTS

| | | | |
|---|---|---|---|
| 5,367,999 | A | 11/1994 | King et al. |
| 5,771,861 | A * | 6/1998 | Musser ............... F02D 41/1401 |
| | | | 123/357 |
| 6,311,674 | B1 | 11/2001 | Igashira et al. |
| 6,357,421 | B1 | 3/2002 | Pritchard |
| 6,609,500 | B2 | 8/2003 | Ricco et al. |
| 6,955,160 | B1 | 10/2005 | Konopacki et al. |
| 7,040,290 | B2 | 5/2006 | Kim |
| 7,051,713 | B2 * | 5/2006 | Mashiki ................ F02D 41/10 |
| | | | 123/299 |
| 7,140,354 | B1 | 11/2006 | Hashemi |
| 9,273,638 | B2 | 3/2016 | Pursifull |
| 9,388,761 | B2 | 7/2016 | Cherniak et al. |
| 9,581,102 | B2 | 2/2017 | Nieddu |
| 9,624,867 | B2 * | 4/2017 | Dolker ............... F02D 41/3854 |
| 2003/0192595 | A1 * | 10/2003 | Benson ................. G01F 1/363 |
| | | | 137/488 |
| 2005/0021213 | A1 * | 1/2005 | Miller ................ F16K 31/0655 |
| | | | 701/100 |
| 2005/0086949 | A1 * | 4/2005 | Noble ..................... F17C 3/08 |
| | | | 62/50.1 |
| 2005/0103543 | A1 * | 5/2005 | Liu ..................... H01M 8/0687 |
| | | | 180/65.275 |
| 2005/0193962 | A1 * | 9/2005 | Mariscal Munoz ... F02M 25/00 |
| | | | 123/26 |
| 2005/0279321 | A1 * | 12/2005 | Crawford ............ F02B 23/0657 |
| | | | 123/260 |
| 2007/0040053 | A1 * | 2/2007 | Date .................. F02M 61/1846 |
| | | | 239/533.2 |
| 2007/0186908 | A1 * | 8/2007 | Fukasawa ............... F02D 41/08 |
| | | | 123/458 |
| 2007/0215072 | A1 * | 9/2007 | Dearth .................. F02D 19/081 |
| | | | 123/25 A |
| 2009/0250038 | A1 * | 10/2009 | Xu .......................... F02D 41/22 |
| | | | 123/457 |
| 2009/0308351 | A1 * | 12/2009 | Okamoto ............ F02D 41/3845 |
| | | | 123/456 |
| 2010/0036585 | A1 * | 2/2010 | Scharfenberg ...... F02D 41/3082 |
| | | | 701/103 |
| 2011/0022290 | A1 * | 1/2011 | Kaneko ................. F02D 41/222 |
| | | | 701/103 |
| 2012/0095668 | A1 * | 4/2012 | Landsmann .......... F02D 35/023 |
| | | | 701/103 |
| 2014/0102416 | A1 | 4/2014 | Sivasubramanian et al. |
| 2014/0136079 | A1 * | 5/2014 | Sivasubramanian ........................ F02D 41/1401 |
| | | | 701/103 |
| 2014/0311454 | A1 * | 10/2014 | Pursifull ............ F02M 37/0017 |
| | | | 123/468 |
| 2015/0027411 | A1 * | 1/2015 | Nieddu ............... F02D 41/1401 |
| | | | 123/456 |
| 2015/0308366 | A1 * | 10/2015 | Melnyk ............... F02D 41/1454 |
| | | | 123/299 |
| 2016/0017819 | A1 | 1/2016 | Miyata et al. |

FOREIGN PATENT DOCUMENTS

KR 10-2013-0042712 4/2013
WO WO 2017/064360 A1 4/2017

* cited by examiner

PRESSURE REGULATING MASS FLOW SYSTEM FOR MULTIPOINT GASEOUS FUEL INJECTION

FIELD OF THE INVENTION

This invention generally relates to fuel systems and control systems for fuel systems. More particularly, this invention relates to fuel systems and method involving gaseous fuel.

BACKGROUND OF THE INVENTION

Conventionally, large reciprocating engines with multipoint fuel metering systems have a manifold absolute pressure (MAP) biased mechanical pressure regulator with a fixed pressure set point. That is, the mechanical pressure regulator is controlled based on feedback from MAP readings. FIG. 8 depicts such a conventional fuel system. As can be seen in relevant part, the gaseous fuel system 100 includes a mechanical pressure regulator 110 that controls the flow of a gaseous fuel into a fuel rail 120. The fuel rail 120 distributes the gaseous fuel to a plurality of gas admission valves 130. The gas admission valves 130 are controlled by a controller 140 that receives a mass flow demand and sets the duration of the opening and closing of the gas admission valves 130 to correspond to the mass flow demand.

In such gaseous fuel systems 100, the mechanical pressure regulator 110 is set at a desired fuel pressure for pressurizing the fuel rail 120. However, unlike liquid fuel systems, the gaseous fuel takes time to fill the fuel rail 120, and because the controller 140 does not know the pressurization status of the fuel rail 120, the system 100 can become overpressurized or underpressurized. That is, when the controller 140 opens and closes the gas admission valves 130, a greater or lesser quantity of gaseous fuel than desired may be delivered to the downstream fuel manifold (not shown) or engine cylinder (not shown).

Additionally, such gaseous fuel systems 100 can, under certain circumstances, experience pressure droop from the mechanical pressure regulator 110, including even mechanical pressure regulators 110 configured to correct using electronic I/P adjustment mechanisms. This pressure droop can limit the applicable operational range of the gas admission valves 130. Further, the fixed pressure setting from the mechanical pressure regulator 110 can cause low opening durations for the gas admission valves 130 at low engine loads, which causes fuel flow inaccuracy. Additionally, this system configuration makes adequate protection of the gas admission valves 130 (and the entire system downstream of pressure regulator) from over pressurization difficult during the initial pressurization of the gaseous fuel system 100. Yet another potential disadvantage of this system configuration relates to the difficulty of determining the gas substitution percentage in dual fuel engines as a result of the gas admission valve 130 inaccuracy mentioned above.

Embodiments of the presently disclosed system and method address the difficulties of determining the pressurization of a gaseous fuel system so as to protect components of the system and to provide accurate fueling. These and other advantages of the invention, as well as additional inventive features, will be apparent from the description of the invention provided herein.

BRIEF SUMMARY OF THE INVENTION

In particular, embodiments of the presently disclosed invention provide a gaseous fuel system and method having coordinated control between an engine controller, an electronic pressure regulator, and the gas admission valves. The controller is provided with certain physical parameters of the gaseous fuel system including system volume, gas admission valve duration, and engine fuel demand. In this way, both pressure and mass flow are able to be controlled independently through an electronic pressure regulation system. Accordingly, mechanical regulator pressure droop is eliminated by controlling pressure to the gas admission valves in a range that is optimized for their performance at a given fuel flow. Further, the fuel system experiences an improvement in turn down, potentially reducing the number of gas admission valve sizes required in the system. Further still, the system is able to operate at a minimum optimum pressurization so as to maximize the duration of the gas admission valves regardless of the load point. In this way, the accuracy and the repeatability of the system performance is enhanced.

A further advantage of the disclosed system and method relates to prevention of over-pressurization and under-pressurization of the fuel system downstream of the electronic pressure regulator through flow and pressure control. These pressurization conditions are created when a large differential pressure is created in the system, such as, for example, during the system's initial start-up filling transient, when a breaker trips causing the engine to go from full load to no load, or when the system is shut down and the shutoff valve is located far upstream of the fuel rail. Such events can create a pressure differential over the operational limit of the gas admission valves. The presently disclosed system and method avoid such pressurization events by using the electronic pressure regulator to provide a faster response to rail pressure during such events. Additionally, the electronic pressure regulator does not have to start in a normally open condition, which minimizes the likelihood of overpressurization.

In one aspect, embodiments of the invention provide a method of regulating flow of a gaseous fuel in a multipoint fuel injection system. In the system, a fuel rail provides the gaseous fuel to a plurality of gas admission valves. A first mass flow of the gaseous fuel is estimated entering the fuel rail using an electronic pressure regulator. A second mass flow of the gaseous fuel is determined exiting the fuel rail. A rate of pressure change in the fuel rail is calculated as a function of a difference between the second mass flow and the first mass flow. Further, at least one of a first effective area of an electronic pressure regulator or a pulse duration of the plurality of gas admission valves is adjusted in response to the calculated rate of pressure change.

In another aspect, embodiments of a gaseous fuel regulation system are provided. The system includes a fuel rail, an electronic pressure regulator (EPR), a plurality of gas admission valves, and an engine control unit (ECU). The EPR is upstream of and in fluid communication with the fuel rail, and the EPR is configured to meter a first mass flow of a gaseous fuel flowing through the EPR. Each gas admission valve is downstream of and in fluid communication with the fuel rail. Further, the ECU is configured to receive a mass flow delivery command and to set a first effective area of the EPR and a second effective area of the plurality of gas admission valves based at least in part on the mass flow delivery command and on the first mass flow.

In yet another aspect, embodiments of a dual fuel system are provided. The dual fuel system includes a first fuel rail carrying a liquid fuel, a second fuel rail carrying a gaseous fuel, and a plurality of engine cylinders. The liquid fuel and the gaseous fuel are combusted in the plurality of engine cylinders, and the flow of the gaseous fuel to the plurality of engine cylinders is controlled by the gaseous fuel regulation system as described above and in greater detail below.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 8:
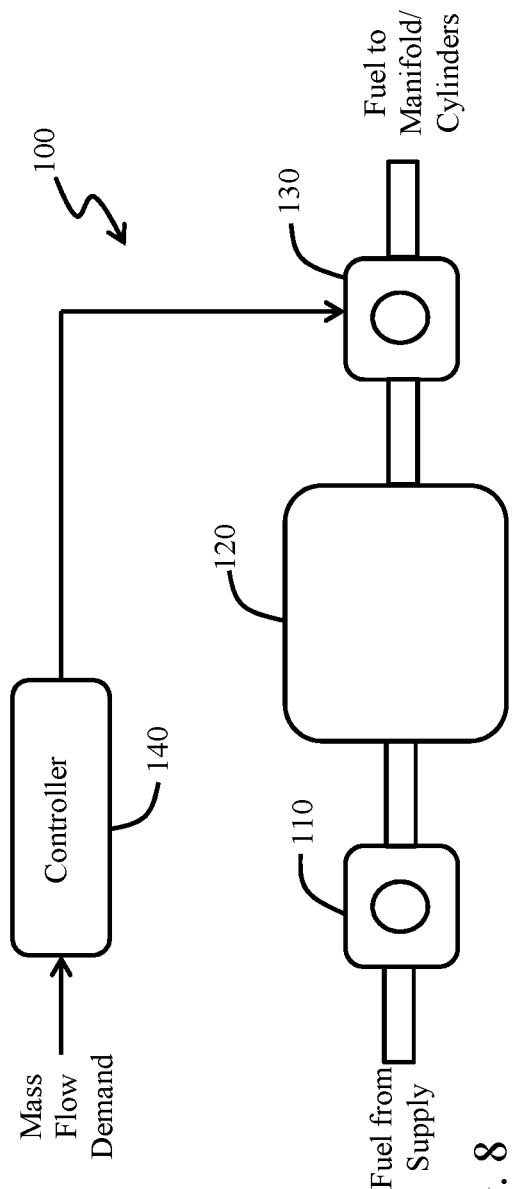
FIG. 8 is a prior art depiction of a gaseous fuel system.

Embodiments of a gaseous or dual fuel electronic pressure regulation system (EPRS) for a multipoint fuel injection (MPFI) engine are described herein. Additionally, embodiments of a method for controlling the EPRS are provided. In particular, the EPRS employs an electronic pressure regulator (EPR) capable of accurately determining and controlling the mass flow of gaseous fuel into a fuel rail so as to avoid pressure droop and over- and under-pressurization of the gas admission valves (GAVs). In particular, using the disclosed EPRS provides another degree of freedom for controlling mass flow in a multipoint system. Conventional fuel control systems (such as those discussed above and shown in FIG. 8) have fixed supply pressures which can accentuate limitations of a MPFI system. By using the EPRS described above, mass flow is able to be controlled to the downstream manifold or engine cylinders very accurately, and the GAVs are able to be driven simultaneously in a pressure/pulse duration that is optimal for accurate and repeatable operation. Exemplary embodiments are provided by way of illustration and not by way of limitation. A person of ordinary skill in the art, upon consideration of the present disclosure, may recognize additional embodiments or modifications that fall within the spirit and scope of the present disclosure.

Figure 1:
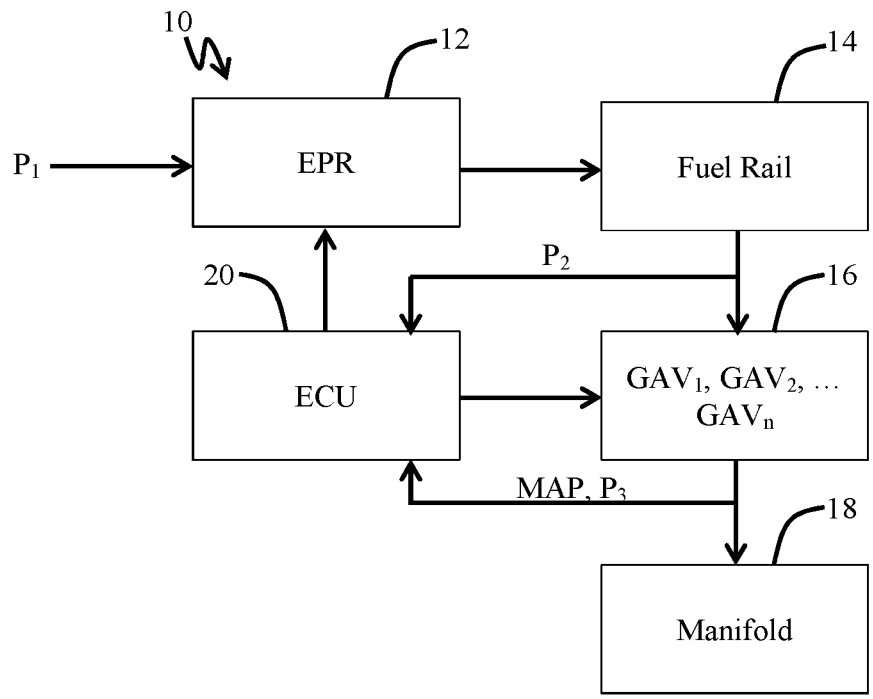
FIG. 1 is a schematic depiction of an electronic pressure regulator system, according to an exemplary embodiment.

FIG. 1 is a schematic representation of a gaseous EPRS 10 for an MPFI engine. In general, gaseous fuel is supplied at a pressure $P_1$ to the EPRS 10. In the EPRS 10, an EPR 12 (such as the TecJet™ series of fuel metering valves, available from Woodward, Inc., Fort Collins, Colo.) determines and controls the flow of the gaseous fuel to provide a desired mass flow rate of the gaseous fuel into a fuel rail 14. As used herein, to "determine" a parameter of the EPRS 10 may include directly measuring the parameter or estimating the parameter using mathematical models that consider, e.g., other directly measured parameters in the EPRS 10. The gaseous fuel is distributed from the fuel rail 14 through a plurality of GAVs 16 to the downstream manifold 18 or, in embodiments, directly to downstream engine cylinders (not shown). In embodiments, the GAVs 16 provide gaseous fuel to the manifold 18 via port injection, and in other embodiments, the GAVs 16 provide gaseous fuel to the cylinders via direct injection. A controller, such as an engine control unit (ECU) 20, coordinates operation of the EPRS 10, including setting the mass flow rate of the EPR 12 and the duration of the GAVs 16. In doing so, the ECU 20 provides the EPR 12 with a pressure demand and a GAV demand and supplies the EPR 12 with information regarding the gaseous fuel, such as the fuel specific gravity (SG) and the adiabatic index ($\gamma$). Additionally, the ECU 20 receives various pressure readings from within the EPRS 10. In particular, the ECU 20 receives a GAV inlet pressure $P_2$ and a GAV outlet pressure, or a manifold absolute pressure (MAP), $P_3$. While the system so described is a gaseous fuel system, the concepts discussed herein also apply to the gaseous component of a dual fuel system, such as a combination diesel and natural gas engine, in which the diesel fuel and the gaseous fuel are distributed on separate rails to an engine cylinder.

Figure 2:
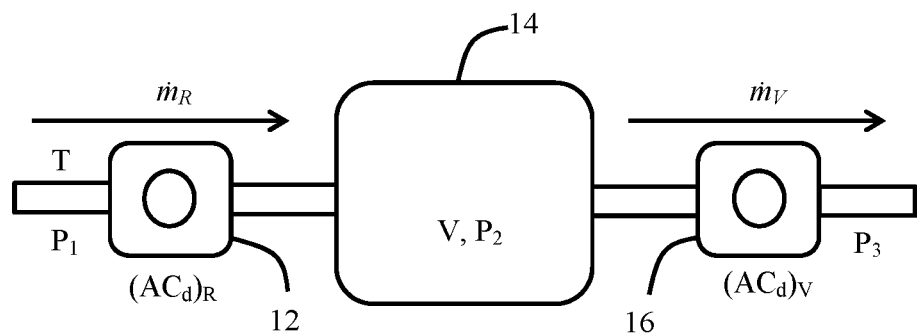
FIG. 2 is a simplified depiction of the electronic pressure regulator, fuel rail, and gas admission valves, according to an exemplary embodiment.

Having generally described the components of the system, a simplified schematic representing the control method is provided in FIG. 2. In FIG. 2, the EPR 12, fuel rail 14, and a GAV 16 are provided along with variables associated with and/or sensed at each location. As can be seen, a temperature T and the pressure $P_1$ are sensed at or near the EPR 12. Additionally, the EPR 12 sets the mass flow rate ($\dot{m}_R$) through the EPR 12 and into the fuel rail 14, which is determined, in part, by the effective area $(AC_d)_R$ for flow through the EPR 12. The fuel rail 14 has a known volume (V), and the pressure $P_2$ of the fuel rail 14 (which is also the GAV 16 inlet pressure) is sensed. At the GAV 16, the mass flow rate ($\dot{m}_V$) through the GAV 16 and into the manifold 18 (as shown in FIG. 1), which is determined, in part, by the effective area $(AC_d)_V$ for flow through the GAV 16.

Figure 3:
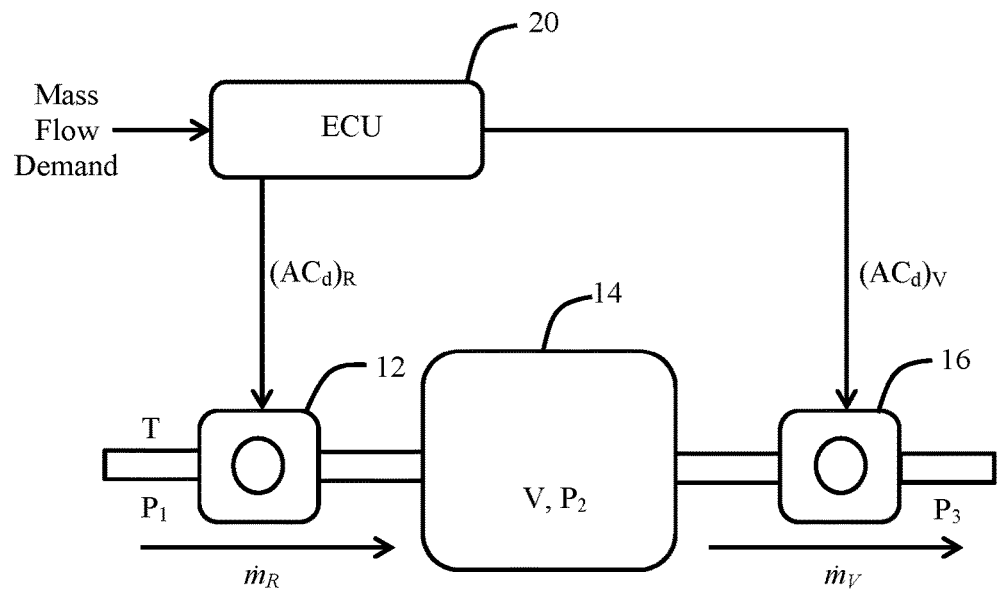
FIG. 3 is a schematic depiction of the control configuration of the electronic pressure regulation system, according to an exemplary embodiment.

Advantageously, the EPR 12 is able to accurately control the mass flow of the gaseous fuel. Further, because of the ability of the EPR 12 to control mass flow, the ECU 20, as shown in FIG. 3, is able to simultaneously control mass flow (via the EPR 12) and pressure of the fuel rail 14 that supplies the GAVs 16 through the following embodiments of a control method. In the control method, the ECU 20 utilizes the following nonlinear coupled equations to provide a model:

$$\dot{m}_R = (AC_d)_R f(P_1, P_2, \text{gas properties}) \quad (1)$$

$$\dot{m}_V = (AC_d)_V f(P_2, P_3, \text{gas properties}) \quad (2)$$

$$\dot{P}_2 = f(\Delta \dot{m}_r, \text{rail geometry, gas properties}) \quad (3)$$

wherein $\dot{m}_R$, $(AC_d)_R$, $P_1$, $P_2$, $\dot{m}_V$, $\dot{m}_R$, $(AC_d)_V$, and $P_3$, are given above. Gas properties are the traditional macroscopic properties (pressure, volume (V), number of particles, temperature (T)) along with the thermodynamic properties of the gaseous fuel. Rail geometry is the physical dimensions of the fuel rail. $\dot{P}_2$ is the rate of change of pressure $P_2$, and $\Delta \dot{m}_r$ is the mass flow rate imbalance in the fuel rail 14 that is a result of $\dot{m}_R$ being either greater or less than $\dot{m}_V$.

In this model, the mass flows $\dot{m}_R$ and $\dot{m}_V$ for the EPR 12 and the GAVs 16, respectively, may be determined by several methods including the standard orifice flow equation, flow characterization of the valve, or using information stored in one of various databases (e.g., the NIST REFPROP database). For equations 1 and 2 above, an example of the standard orifice flow equation implementation of the $f(\bullet)$ function given by:

$$f(P_1, P_2, T, R_s, \gamma) =$$

$$\begin{cases} \sqrt{\dfrac{2}{TR_s} \dfrac{\gamma}{\gamma-1}\left(\left(\dfrac{P_2}{P_1}\right)^{2/\gamma} - \left(\dfrac{P_2}{P_1}\right)^{(\gamma+1)/\gamma}\right)} & \text{for } \left(\dfrac{2}{\gamma+1}\right)^{\gamma/\gamma-1} < \dfrac{P_2}{P_1} < 1 \\ \sqrt{\dfrac{1}{TR_s} \gamma \left(\dfrac{2}{\gamma+1}\right)^{(\gamma+1/\gamma-1)}} & \text{for } \dfrac{P_2}{P_1} \leq \left(\dfrac{2}{\gamma+1}\right)^{\gamma/\gamma-1} \end{cases}$$

This function may be implemented directly, approximated, or accomplished via a lookup table. In the above equation, $\gamma$ is the adiabatic index.

In equation 3, the $f(\bullet)$ function may be formulated in various ways. If ideal gas assumptions hold and the temperature and fuel composition is constant, $\dot{P}_2$ may be expressed as a mass imbalance multiplied by a constant (e.g., $R_s*T/V$). However, this could also be modeled using thermodynamic properties and real gas properties. If rail dynamics are substantial, they could also be included in this model. If spatial dynamics are included, the modeled $P_2$ could be at any point in the rail.

The control objective is to independently control both the mass flow through the GAVs 16 (through varying the pulse duration) and the pressure $P_2$ in the volume V of the fuel rail 14 independently. A general form of equations for $AC_d$ that accomplish this control objective are given by:

$$(AC_d)_V = \frac{\dot{m}_V}{f(P_2^{ref}, P_3, \text{gas properties})} \quad (4)$$

$$(AC_d)_R = \frac{\dot{m}_V + \Delta \dot{m}_r^{ref}}{f(P_1, P_2^{ref}, \text{gas properties})} \quad (5)$$

For this model, the flow is assumed to change instantaneously with changes in effective area $(AC_d)$, and there are no spatial dynamics with filling the volume V of the fuel rail 14. As discussed further below, these assumptions can be changed depending on the specific configuration of the EPRS 10.

Figure 4:
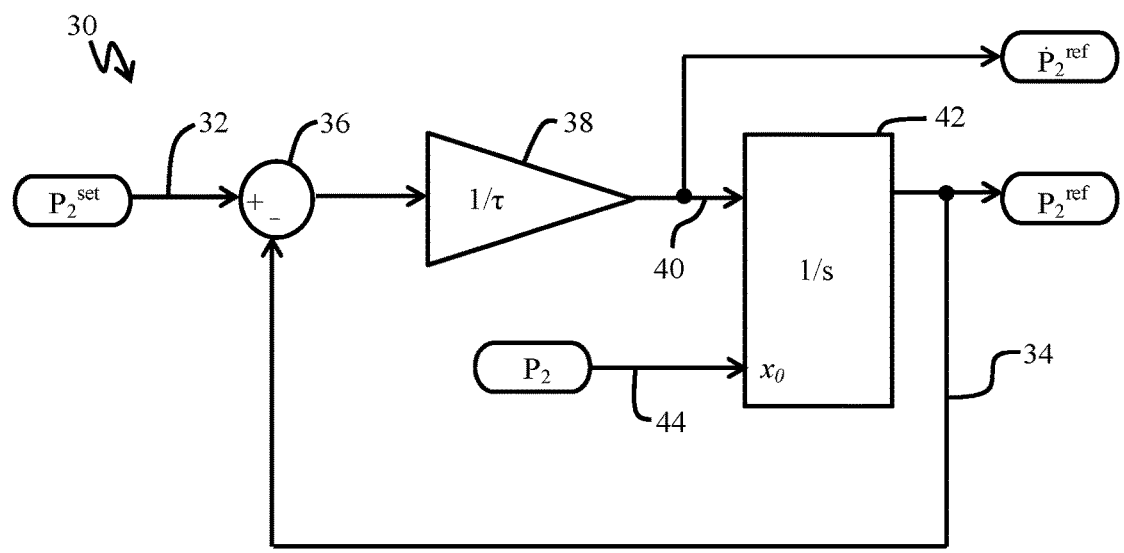
FIG. 4 is a schematic depiction of a first order filter for determining the rate of fuel rail pressure change, according to an exemplary embodiment.

If the desired pressure $P_2$ is actively changing, equations 4 and 5 utilize the reference mass imbalance $\Delta \dot{m}_r^{ref}$, which is obtained by inverting equation 3 for a given set of gas properties. This requires a reference rate of pressure change $\dot{P}_2^{ref}$, which is able to be obtained by either numerically differentiating the set point $P_2^{set}$ or by filtering the set point and extracting the velocity term. FIG. 4 provides a schematic of a first order filter 30 for obtaining $\dot{P}_2^{ref}$. As can be seen in FIG. 4, the first order filter 30 has an input signal 32 corresponding to the commanded volume pressure $P_2^{set}$. The input signal 32 is summed with a feedback signal 34, which corresponds to $P_2^{ref}$, at summing point 36. The sum of the input signal 32 and the feedback signal 34 is provided to a buffer amplifier 38, and the output signal 40 of the buffer amplifier 38, which corresponds to $\dot{P}_2^{ref}$, is one of the inputs for an integrator 42. The other integrator input 44 is the sensed pressure $P_2$. Using such a first order filter 30, $P_2^{ref}$ and $\dot{P}_2^{ref}$ define the trajectory that volume pressure will actually follow. By using $P_2^{ref}$ and $\dot{P}_2^{ref}$ in equations 4 and 5 for $AC_d$, independent control of mass flow $\dot{m}_V$ through the GAVs 16 (as shown in FIGS. 1-3) and of volume pressure $P_2$ is provided.

Figure 5:
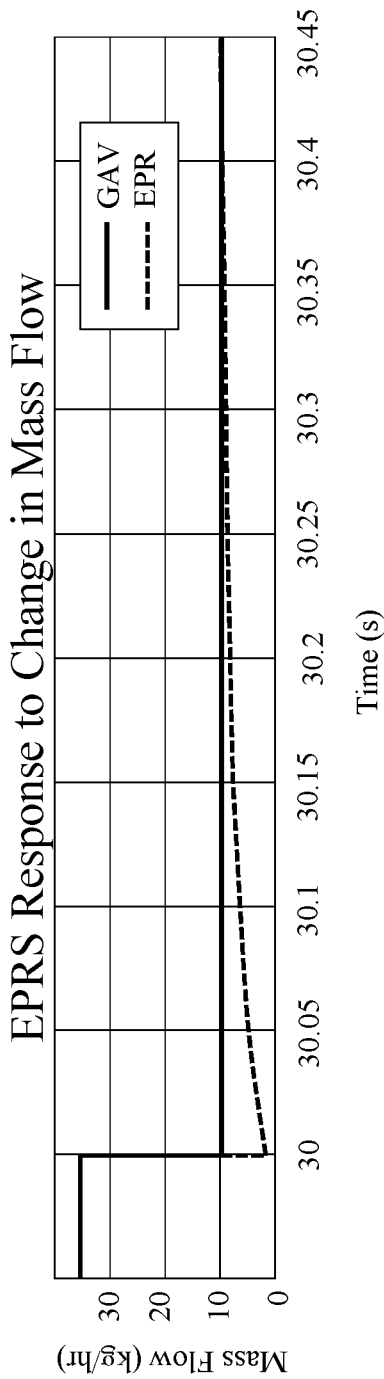
FIG. 5 is a graphical representation of the responses of the gas admission valves and electronic pressure regulator to a change in mass flow demand, according to an exemplary embodiment.
Figure 6:
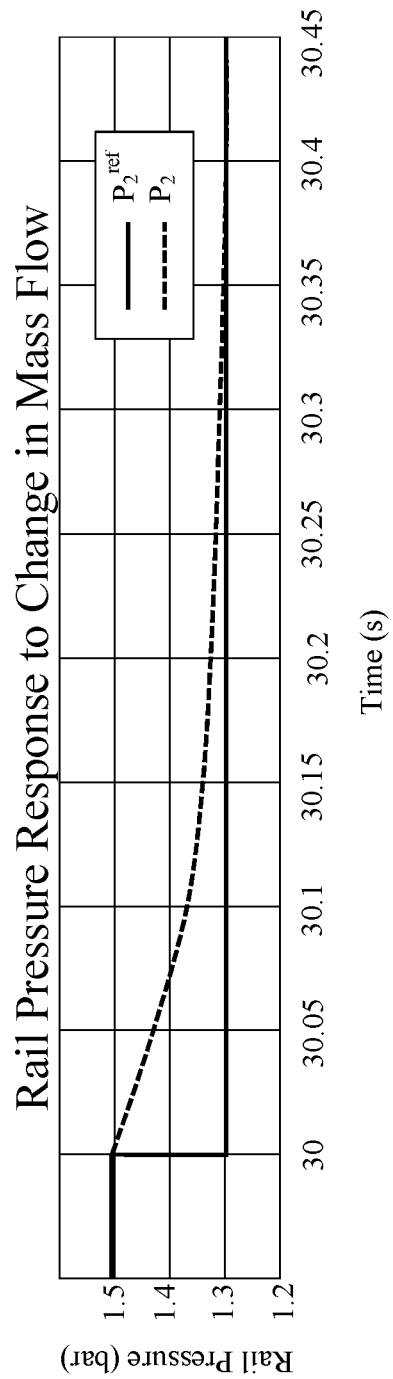
FIG. 6 is a graphical representation of the response of the actual rail pressure to a change in a reference pressure resulting from the change in mass flow from FIG. 5, according to an exemplary embodiment.
Figure 7:
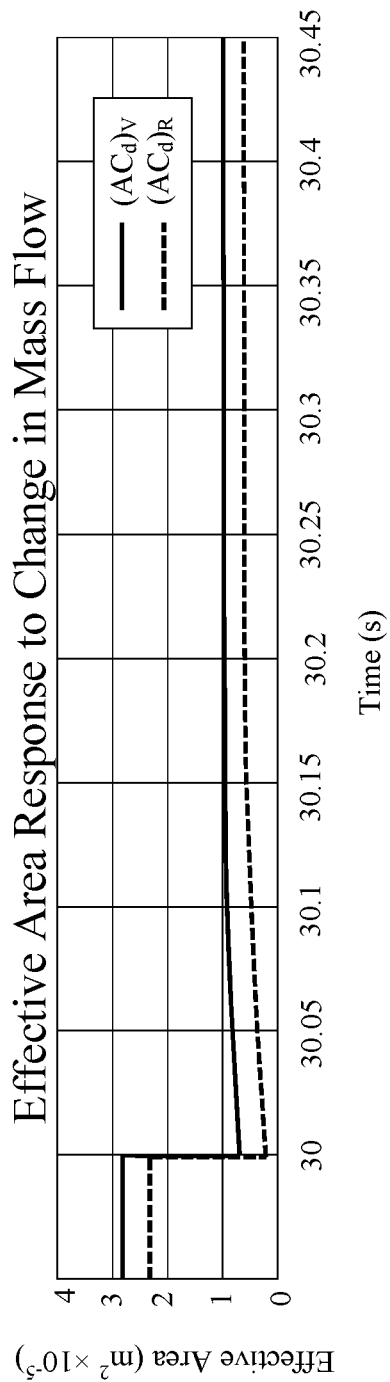
FIG. 7 is a graphical representation of change in effective area for the gas admission valves and the electronic pressure regulator resulting from the change in mass flow from FIG. 5, according to an exemplary embodiment.

Exemplary embodiments of a hypothetical response of the EPRS 10 according to the first order filter 30 of FIG. 4 based on equations 4 and 5 are shown in FIGS. 5-7. As shown in FIG. 5, the mass flow $\dot{m}_V$ through the throttle or GAVs 16 instantaneously changes from 35 kg/hr to 10 kg/hr. The filling volume of the EPR 12 adjusts $P_2$ without affecting mass flow $\dot{m}_V$ through the GAVs 16. As shown in FIG. 6, the reference pressure $P_2^{ref}$ is stepped down from 1.5 bar to 1.3 bar, and the actual pressure $P_2$ that is tracked by the system is seen dropping to the stepped down volume pressure of 1.3 bar. As shown in FIG. 7, there is an initial jump in the effective areas $(AC_d)_R$ and $(AC_d)_V$ to create the change in mass flow. In particular, the change in effective area $(AC_d)_V$ is produced through changing the pulse duration of the GAVs 16, and the change in effective area $(AC_d)_R$ is produced by adjusting the opening of the EPR 12. As can be seen, a gap is provided between the effective areas $(AC_d)_R$ and $(AC_d)_V$ to maintain a constant pressure $P_2$. In responding to the change in mass flow, the gap is initially widened, but the control scheme reacts to re-establish and maintain the gap corresponding to a constant pressure $P_2$. Thus, the EPRS 10 utilizes a control scheme that dynamically changes both $AC_d$ values to keep mass flow through the GAVs 16 constant as $P_2$ changes.

Advantageously, the concepts underlying the control scheme are extendable to actuators with finite bandwidth by ensuring that $AC_d$ values for the EPR 12 and the GAVs 16 are synchronized with the volume reference trajectory. Finite bandwidth limitations refer to two conditions. First, the EPR 12 and GAVs 16 take a non-zero amount of time to change effective areas. For example, the actuator of the EPR 12 accelerates to move and decelerates to stop, i.e., the change in effective area $(AC_d)_R$ is not instantaneous. Similarly, the GAVs 16 change effective area $(AC_d)_V$ by changing pulse duration on a pulse-by-pulse basis. Thus, the change in pulse duration of the GAVs 16 is able to be coordinated with the change in effective area $(AC_d)_R$ of the EPR 12 over the timing of changing effective area $(AC_d)_R$. Second, the EPR 12 and GAVs 16 have absolute operational limits for effective area $AC_d$. For example, the EPR 12 is limited in movement between a fully open condition and a fully closed condition. The GAVs 16 have a maximum pulse duration and a minimum pulse duration needed to maintain delivery of fuel to the system. For this second condition, observing the finite bandwidth limitations is achieved by saturating the reference $P_2$ velocity, e.g., saturating $\dot{P}_2^{ref}$ (output signal 40) as shown in FIG. 4.

While the previous example did not consider any spatial dynamics in filling the volume V of the fuel rail 14, in embodiments the EPR 12 is configured to start changing the volume pressure $P_2$ before the GAVs 16 (or throttle) begin changing their effective area $AC_d$. In this way, the EPR 12 leads the GAVs 16, which is something that conventional mechanical regulators, as described above, are unable to perform. Further, the EPRS 10 as described herein provides for asynchronous control of the EPR 12 and the GAVs 16. That is, the effective areas $(AC_d)_R$ and $(AC_d)v$ are able to be changed independently at different times, or to put it differently, the effective areas $(AC_d)_R$ and $(AC_d)v$ do not have to be changed at the same time.

Returning to FIG. 3, the aforementioned control method is implemented by adding an algorithm to the ECU 20. The algorithm computes in real time the state of the volume V of the fuel rail 14. In particular, the state parameter is defined by the pressure $P_2$, and $P_2$ is determined based on the mass imbalance as defined in equation 3. State-based control in the EPRS 10 is able to be provided by combining the functionality of a mass control device with high accuracy mass flow monitoring and control. State-based control has the advantage of being user friendly in that such control allows for the user to input a simple demand, such as a desired mass flow, and the ECU 20 will configure the EPRS 10 in accordance with the demand.

According to the EPRS 10, the ECU 20 receives a mass flow delivery command based upon engine requirements (e.g., speed, load, environment, etc.). The ECU 10, using the above-described algorithm, meets the exit mass flow command by changing the duration of the GAVs 16 utilizing the knowledge of the constant pressure $P_2$ of the fuel rail 14. Accordingly, the algorithm provides the ability to prescribe the pressure $P_2$ in the fuel rail 14 during the execution of a new mass flow set point by managing the pressure $P_2$ in the fuel rail 14 to a pressure set point that is used to accurately calculate the duration of the GAVs 16. Further, any mismatch in the actual mass flow to the target mass flow will manifest as a change in the pressure $P_2$ of the fuel rail 14. In this way, stabilization of the pressure $P_2$ serves as an indication that the mass flow $\dot{m}_V$ exiting the GAVs 16 matches the mass flow $\dot{m}_R$ entering the fuel rail 14 through the EPR 12. In this way, an EPR 12 is able to be used from a prognostics standpoint to determine when the GAVs 16 need to be serviced.

Further, because the inlet mass flow controller in the EPR 12 is very accurate, the calibration constants of the GAVs 16 are able to be updated and saved at times of steady pressure (i.e., at times when the rate of pressure change is at or near zero) using the mass flow from the EPR 12, thereby enabling automatic recalibration during the life of the GAVs 16. Additionally, the present system and method help to prevent over-pressurization of the GAVs 16 during large transient events by using the EPR 12 to manage pressure. As an example of such a large transient event, during a full load rejection condition, the manifold absolute pressure could drop significantly, which would create a large differential pressure across the GAVs 16. As another example, a large pressure differential could be created during a shutdown event in which the shutoff valve is located well upstream of the fuel rail. In such situations, the close coupling of the EPR 12 to the GAVs 16 allows for a faster reduction in the pressure $P_2$ of the fuel rail 14 during such events.

Additional protection is provided to the GAVs 16 because the algorithm knows the upper and lower operability pressure limits (i.e., finite bandwidth limitations) of the GAVs 16 and is able to manage the pressure $P_2$ of the fuel rail 14 to stay within those operability limits by commanding temporary deviations in the inlet mass flow $\dot{m}_R$. Similar protection is provided for the EPR 12 such that the EPR 12 operates within its finite bandwidth limitations to maintain accuracy of the EPR 12 and avoid damage. Thus, if the pressure $P_2$ is trending high, the inlet mass flow controller executes a temporary mass flow rate reduction/imbalance, such that the outflow exceeds the inflow and the pressure differential is negative. Conversely, if the pressure $P_2$ is trending low, the inlet mass flow device will temporarily increase mass flow to increase the pressure $P_2$. Further, ideally, the pressure $P_2$ in the fuel rail 14 is maintained as low as possible (with margin) to maintain the duration of the GAVs 16 as long as possible. Without the level of monitoring and control provided by the disclosed EPRS 10, the pressure $P_2$ typically would not be set so low because of the possibility of droop taking it under the operable pressure All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of regulating flow of a gaseous fuel in a multipoint fuel injection system in which a fuel rail provides the gaseous fuel to a plurality of gas admission valves, the method comprising the steps of:

determining a first mass flow of the gaseous fuel entering the fuel rail using an electronic pressure regulator;

determining a second mass flow of the gaseous fuel exiting the fuel rail;

calculating a rate of pressure change in the fuel rail as a function of a difference between the second mass flow and the first mass flow; and adjusting at least one of a first effective area of an electronic pressure regulator or a second effective area of the plurality of gas admission valves in response to the calculated rate of pressure change.

2. The method of claim 1, further comprising a step of creating a negative rate of pressure change when a pressure in the fuel rail trends toward a predetermined upper limit.

3. The method of claim 2, wherein the step of creating a negative rate of pressure change further comprises executing a temporary reduction in the first mass flow such that the second mass flow is greater than the first mass flow.

4. The method of claim 1, further comprising a step of creating a positive rate of pressure change when a pressure in the fuel rail trends toward a predetermined lower limit.

5. The method of claim 4, wherein the step of creating a positive rate of pressure change further comprises executing a temporary increase in the first mass flow such that the first mass flow is greater than the second mass flow.

6. The method of claim 1, wherein the step of calculating a rate of pressure change comprises numerically differentiating a pressure set point.

7. The method of claim 1, wherein the step of calculating a rate of pressure change comprises filtering a pressure set point and extracting a velocity term.

8. The method of claim 1, further comprising the step of calibrating the plurality of gas admission valves during a time in which the rate of pressure change is zero.

9. The method of claim 8, wherein the step of calibrating the plurality of gas admission valves further comprises calibrating based on the first mass flow determined by the electronic pressure regulator.

10. The method of claim 1, further comprising the step of changing the first effective area of the electronic pressure regulator so as to create a pressure change and wherein the adjusting step comprises adjusting the second effective area of the plurality of gas admission valves in response to the calculated rate of pressure change.

11. The method of claim 10, further comprising the step of coordinating the step of changing the first effective area of the electronic pressure regulator and the step of adjusting the second effective area of the plurality of gas admission valves so as to maintain a desired second mass flow through the plurality of gas admission valves.

12. The method of claim 11, further comprising the step of providing first finite bandwidth limitations for the first effective area of the electronic pressure regulator and second finite bandwidth limitations for the second effective area of the plurality of gas admission valves;
wherein the step of changing the first effective area of the electronic pressure regulator does not exceed the first finite bandwidth limitations;
wherein the step of adjusting the second effective area of the plurality of gas admission valves does not exceed the second finite bandwidth limitations; and
wherein the rate of pressure change is saturated during the steps of adjusting the first effective area and the second effective area.

13. The method of claim 1, wherein the adjusting step further comprises adjusting at least one of the first effective area of the electronic pressure regulator or the second effective area of the plurality of gas admission valves so that the rate of pressure change transitions to zero.

14. The method of claim 13, wherein, after the rate of pressure change has transitioned to zero, the first mass flow and the second mass flow both equal a third mass flow that is different from either of the first mass flow and the second mass flow.

15. A gaseous fuel regulation system, comprising:
a fuel rail;
an electronic pressure regulator (EPR) upstream of and in fluid communication with the fuel rail, the EPR configured to meter a first mass flow of a gaseous fuel flowing through the EPR;
a plurality of gas admission valves, each gas admission valve being downstream of and in fluid communication with the fuel rail; and
a controller, the controller being configured to receive a mass flow delivery command and to set a first effective area of the EPR and a second effective area of the plurality of gas admission valves based at least in part on the mass flow delivery command and on the first mass flow.

16. The gaseous fuel regulation system of claim 15, wherein a pressure of the fuel rail is communicated to the controller, wherein the controller is configured to calculate a rate of change of the pressure, and wherein the controller is configured to set the first and second effective areas based also on the rate of change of the pressure.

17. The gaseous fuel regulation system of claim 16, further comprising a first order filter configured to filter a pressure set point and extract a velocity term in order to calculate the rate of change of the pressure.

18. The gaseous fuel regulation system of claim 16, wherein the controller is configured to calculate the rate of change of the pressure by extracting a velocity term from a dynamic model or a dynamic system.

19. The gaseous fuel regulation system of claim 16, wherein, when the rate of change of the pressure is positive, the controller is configured to decrease the first effective area.

20. The gaseous fuel regulation system of claim 19, wherein, when the rate of change of the pressure is negative, the controller is configured to increase the first effective area.

21. The gaseous fuel regulation system of claim 20, wherein, for a given mass flow command, the controller is configured to increase or decrease the first effective area without adjusting the second effective area.

22. The gaseous fuel regulation system of claim 15, wherein the controller is configured to set the first effective area and the second effective area asynchronously.

23. A gaseous fuel regulation system, comprising:
a fuel rail;
an electronic pressure regulator (EPR) upstream of and in fluid communication with the fuel rail, the EPR configured to meter a first mass flow of a gaseous fuel flowing through the EPR;
a plurality of gas admission valves, each gas admission valve being downstream of and in fluid communication with the fuel rail; and
a controller, the controller being configured to receive a mass flow delivery command and to set a first effective area of the EPR and a second effective area of the plurality of gas admission valves based at least in part on the mass flow delivery command and on the first mass flow;
wherein the plurality of gas admission valves each have upper and lower operability pressure limits and wherein the controller is configured to maintain a pressure in the fuel rail within the upper and lower operability limits of the gas admission valves.

24. A dual fuel system, comprising:
a first fuel rail carrying a liquid fuel;
a second fuel rail carrying a gaseous fuel; and
a plurality of engine cylinders;

wherein the liquid fuel and the gaseous fuel are combusted in the plurality of engine cylinders; and wherein flow of the gaseous fuel to the plurality of engine cylinders is controlled by the gaseous fuel regulation system of claim 15.

25. The dual fuel system of claim 24, wherein the liquid fuel comprises diesel fuel.

\* \* \* \* \*